Patented Aug. 10, 1937

2,089,810

UNITED STATES PATENT OFFICE 2,089,810

PLASTIC COMPOSITIONS AND METHOD OF MAKING SAME

Nicholas J. Penning, Chicago, Ill., assignor to Penolite Corporation, Chicago, Ill., a corporation of Delaware No Drawing. Application October 29, 1934, Serial No. 750,594

7 Claims. (Cl. 106—23)

The present invention relates to novel plastic compositions having a rubber base, and in the novel means and method of making the same.

Among the objects of the present invention is to provide a novel plastic composition which when compounded, vulcanized and cured, forms a material which not only possesses a toughness and ability to resist abrasion and withstand hard usage and abuse, but also may be readily and easily machined.

A further object of the invention is to provide a novel composition of matter formed of a rubber base, which although possessing toughness to a high degree is nevertheless flexible or yieldable and has a wide field of use, particularly in the field of insulation and handles for screw drivers and other tools, etc.

Another object of the present invention is the provision of a rubber-base plastic having the properties of being waterproof, oil-resistant, substantially non-inflammable and practically indestructible.

A still further object is the provision of a plastic material which when taken from the mould or extruded, possesses a relatively high degree of gloss, thereby making it generally unnecessary to buff or polish the surface.

Another object of the present invention is in the novel method and means of preparing the mixture or aggregate and in compounding the same.

Further objects and advantages are inherent in and will become apparent from the following disclosure and claims.

The novel invention consists preferably in a composition of rubber, vulcanizing agent, filler, dispersing and softening agent, synthetic wax or resin, and an accelerator. If a colored product is desired, suitable coloring matter may be added. The rubber base employed may be of any kind suitable for the purpose, such as pale crepe, smoke sheet, brown crepe, roll brown, reclaim or the like, depending primarily upon the use of the finished product and the cost thereof.

As to the vulcanizing agent or sulphur employed, the proportion thereof may be varied from substantially 25 to 35 parts to every 100 parts of rubber base, depending upon the quality of the rubber base and the use and quality of the finished product.

The amount of filler which is dispersed in the present plastic is extremely high. Such amount may vary with good results from substantially 100 to 175 parts to every 100 parts of rubber base, depending upon the quality and use of the finished product. By reason of the high percentage or amount of filler used, the cost of which may be considerably lower than that of the rubber base, the ultimate cost of the finished product may be reduced to a minimum, this being a considerable factor in the commercial success and replacement by the present material of the plastics now on the market.

The type of filler preferably employed in the present composition is rubber dust or ground rubber scrap or reclaim which has a relatively low market value. The use of such a filler offers greater toughness, indestructibility and resistance than were inert fillers employed. Aso the type of filler used forms a pliable filler as distinguished from the stiffening fillers.

A suitable dispersing and softening agent is employed for dispersing the filler in the body of the rubber base or aggregate mass. The amount of such agent may normally vary from approximately 4 to 12 parts to every 100 parts of rubber base, such amount depending upon the quantity of filler to be dispersed. Such dispersing agent is preferably pine tar or pitch, although petrolatum, resin, asphaltum or coal tar product may be used with rather good results, depending upon the product desired, flexibility thereof and the efficiency of the dispersing and softening agent.

To make the composition waterproof and substantially non-inflammable, as well as to provide the finished product with a glossy finish without the necessity of buffing and polishing in a manner required with known compositions such as those employing a phenol resin or cellulose base, the invention comprehends the inclusion of a wax or resin. Such a wax or resin is preferably a synthetic product such as chloronaphthalene or other halogenated coal tar derivative having a relatively high melting point, although natural waxes may also be employed. The amount of such wax may vary between 2 to 10 parts to every 100 parts of rubber base.

If it is desired to expedite the period required in curing the resulting product, a suitable accelerator may be added. Such an accelerator is preferably diphenylguanidine (known commercially as D. P. G.). The quantity of such accelerator may be varied in the proportion of approximately 2 to 8 parts of D. P. G. for every 100 parts of rubber base, which amount of accelerator is also dependent upon the nature and amount of filler employed.

In the preparation of the plastic composition, although the proportions may be varied as above, I have found that best results were obtainable when the ingredients were compounded in approximately the following proportions:

| | Parts |
|---|---|
| Rubber base | 100 |
| Vulcanizing agent | 29 |
| Filler | 146 |
| Dispersing and softening agent | 8 |
| Wax or resin | 6 |
| Accelerator | 3.5 |

The resulting composition or product is admirably adapted for use as an insulator, screw driver or other tool handle or the like, and, in fact, wherever a rubber-base composition may be employed or is desirable. This composition has numerous advantages over other compositions, including not only those made of phenol resins, cellulose, etc., but also those made of hard or soft rubber.

The invention also includes the novel method and means of compounding the mix. This consists in breaking down the rubber base on a mill or the like, for a period of approximately 30 minutes, and then adding thereto the requisite amount of vulcanizing agent or sulphur. Approximately one-half of the filler is next added to the initial mix. This filler is preferably rubber dust or ground or comminuted rubber, which may be readily mixed with and dispersed in the aggregate. The remainder of the filler is then mixed with the dispersing and softening agent, accelerator and synthetic wax or resin. If desired, a requisite amount of coloring matter may be added to give color to the resulting product. After this second batch has been thoroughly mixed it is added to the initial batch on the mill and the entire mass or aggregate is then compounded into a completely and thoroughly mixed and homogeneous mass.

The entire batch or mass after such thorough compounding is removed from the mill and allowed to stand for a period of approximately 24 hours, after which it is returned to a cold mill and again worked for substantially 15 minutes. The completed mix is then ready for moulding or extrusion and curing.

The above method lends itself admirably to a standardization and uniformity in the resultant product. It lends itself to use in tool handles and wherever a tough and substantially indestructible material is desired or required, while insulation made therefrom is not subject to porosity, and is much more stable and lasting than prior compositions adapted for similar purposes.

Having now described my invention, I claim:

1. A plastic composition comprising the following ingredients in the following approximate proportions: rubber 100 parts; vulcanizing agent 25 to 35 parts; rubber dust 100 to 175 parts; dispersing and softening agent 4 to 12 parts; and a wax 2 to 10 parts.

2. A plastic composition comprising the following ingredients in the following approximate proportions: rubber 100 parts; vulcanizing agent 25 to 35 parts; ground rubber 100 to 175 parts; pine oil 4 to 12 parts; and a synthetic wax 2 to 10 parts.

3. A plastic composition of matter consisting in the following ingredients in substantially the following proportions: rubber 100 parts; vulcanizing agent 29 parts; filler 146 parts; dispersing and softening agent 8 parts; and wax 6 parts.

4. A plastic composition of matter consisting in the following ingredients in substantially the following proportions: rubber 100 parts; vulcanizing agent 29 parts; rubber dust 146 parts; pine oil 8 parts; and synthetic wax 6 parts.

5. A plastic composition of matter consisting in the following ingredients in substantially the following proportions: rubber 100 parts; vulcanizing agent 29 parts; ground rubber 146 parts; pine oil 8 parts; and chloronaphthalene 6 parts.

6. In the method of preparing a plastic composition, the steps of breaking down a rubber base, adding thereto a vulcanizing agent and a substantial part of a filler of rubber dust, then mixing said aggregate as a batch, next mixing the remainder of said filler with a requisite amount of a dispersing and softening agent and a wax to form another batch, and mixing and compounding said separate batches to form a homogeneous plastic composition.

7. The method of preparing a plastic composition comprising the steps of breaking down a rubber base, adding thereto a vulcanizing agent and a substantial part of a filler of rubber dust or ground rubber, then mixing said aggregate as a batch, next mixing the remainder of said filler with a requisite amount of a dispersing and softening agent and a wax to form another batch, and mixing and compounding said separate batches to form a homogeneous plastic composition, allowing said total batch to stand for a period of approximately 24 hours, and then again working and compounding the total batch to form a uniform and homogeneous mass or composition ready for moulding, extrusion, etc.

NICHOLAS J. PENNING.